US012367274B2

United States Patent
Gehtman et al.

(10) Patent No.: US 12,367,274 B2
(45) Date of Patent: Jul. 22, 2025

(54) VERIFICATION AND/OR VALIDATION OF UNREVERSIBLE INFORMATION HANDLING SYSTEM COMMANDS

(71) Applicant: Dell Products, L.P., Round Rock, TX (US)

(72) Inventors: Yevgeni Gehtman, Modi'in (IL); Maxim Balin, Gan-Yavne (IL); Tomer Shachar, Beer-Sheva (IL)

(73) Assignee: Dell Products, L.P., Round Rock, TX (US)

( * ) Notice: Subject to any disclaimer, the term of this patent is extended or adjusted under 35 U.S.C. 154(b) by 287 days.

(21) Appl. No.: 18/056,909

(22) Filed: Nov. 18, 2022

(65) Prior Publication Data

US 2024/0169050 A1     May 23, 2024

(51) Int. Cl.
    *G06F 21/00*         (2013.01)
    *G06F 21/44*         (2013.01)

(52) U.S. Cl.
    CPC .................................... *G06F 21/44* (2013.01)

(58) Field of Classification Search
    CPC ................................. G06F 21/44; G06F 21/57
    See application file for complete search history.

(56) References Cited

U.S. PATENT DOCUMENTS

| 2015/0363590 A1* | 12/2015 | Patel | H04L 63/102 |
| | | | 726/17 |
| 2016/0328180 A1* | 11/2016 | Wang | G06F 3/0608 |
| 2018/0018663 A1* | 1/2018 | Van | G07F 7/0873 |
| 2021/0056207 A1* | 2/2021 | Tiwari | G06F 8/65 |
| 2022/0129389 A1* | 4/2022 | Shiner | G06F 21/602 |

* cited by examiner

*Primary Examiner* — Michael M Lee
(74) *Attorney, Agent, or Firm* — Fogarty LLP (57) ABSTRACT

An unreversible command is verified and validated pre-execution in an IHS, and execution of the unreversible command is authenticated in the IHS with (a) physical component(s). The physical component(s) may be a pair of pre-registered disks-on-keys (DOKs), wherein the DOKs are simultaneously connected to pre-registered slots of the IHS, and a determination is made whether a serial number of each respective pre-registered DOK is correlated with a respective pre-registered slot number (and IHS motherboard serial number) in a Trusted Platform Module (TPM) of the IHS. Alternatively, or additionally, (the) (a) physical component(s) may be (a) physical token(s) (DOK(s)) produced when a pre-approval for execution of the unreversible command on the IHS is granted, wherein (a) security attribute(s) for execution of the unreversible command on the IHS is/are set and the physical token is signed with a public key which matches a private key stored in a TPM of the IHS.

19 Claims, 5 Drawing Sheets

VERIFICATION AND/OR VALIDATION OF UNREVERSIBLE INFORMATION HANDLING SYSTEM COMMANDS

CROSS REFERENCE

This application is related to U.S. patent application Ser. No. 18/056,885, entitled Systems and Methods for Digital Retirement of Information Handling Systems, filed concurrent herewith, on Nov. 18, 2022, and which is incorporated herein by reference.

FIELD

This disclosure relates generally to Information Handling Systems (IHSs), and, more specifically, to verification and/or validation of unreversible IHS commands.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Unreversible commands which may be executed in an IHS may cause permanent damage. Execution of such unreversible commands may involve a "human-factor margin" of mistake or may be a malicious act.

SUMMARY

Embodiments of systems and methods for verification and/or validation of unreversible Information Handling Systems (IHS) commands are described. In an illustrative, non-limiting example of verification and/or validation of unreversible IHS commands an unreversible command pre-execution is verified in an IHS, the unreversible command is validated pre-execution in the IHS, and execution of the unreversible command is authenticated in the IHS with one or more physical components.

For example, the physical component(s) may be a pair of pre-registered disks-on-keys (DOKs) and verifying the unreversible command, validating the unreversible command and authenticating execution of the (particular) unreversible command may include receiving connection of the two pre-registered DOKs, generally simultaneously, to pre-registered slots of the (particular) IHS and determining whether a serial number of each respective pre-registered DOK is correlated with a different respective pre-registered slot number (and IHS motherboard serial number) in a Trusted Platform Module (TPM) of the IHS. For example, determining whether the serial numbers of each respective DOK is correlated with the respective slot numbers in a TPM of the IHS may include determining both of: whether the serial number of a first DOK is correlated with the slot number (and the IHS motherboard serial number) of the slot receiving the first DOK, in the TPM of the IHS, and whether the serial number of a second DOK is correlated with the slot number (and the IHS motherboard serial number) of the slot receiving the second DOK, in the TPM of the IHS.

In accordance therewith, execution of the unreversible command on the IHS is prevented, in response to the serial number of each respective pre-registered DOK not being correlated with a different respective pre-registered slot number in the TPM of the IHS. However, execution of the unreversible command on the IHS is allowed, in response to the serial number of each respective pre-registered DOK being correlated with a different respective pre-registered slot number in the TPM of the IHS.

In such implementations, to pre-register the DOKs, before receiving connection of the DOKs to the pre-registered slots of the IHS, the serial numbers of each of the DOKs are flashed to, or otherwise recorded in, the TPM of the IHS to pre-register the DOKs. To preregister the slots, the slot numbers of the two slots (and the IHS motherboard serial number) are flashed to, or otherwise recorded in, the TPM of the IHS to pre-registered the slots. The serial number of one of DOKs may then be correlated, in the TPM of the IHS, with one of the slot numbers (and the IHS motherboard serial number) and the serial number of the other of the DOKs with the other of the slot numbers (and the IHS motherboard serial number). This flashing of the serial numbers of each of the DOKs to, flashing of the slot numbers to and correlating of the serial numbers of the DOKs with the respective slot numbers of the IHS, in the TPM may be carried out at a time of manufacture of the IHS.

Alternatively, or additionally, an example of (a) physical component(s) used to authenticate execution of the (particular) unreversible command in the (particular) IHS may be (a) physical token(s) (e.g., (a) DOK(s)) produced when a pre-approval for execution of the unreversible command on the IHS is granted. In such implementations, verifying the unreversible command, validating the unreversible command and authenticating execution of the unreversible command may include setting one or more security attributes for execution of the unreversible command on the IHS, including the security attribute(s) in the physical token when the physical token is produced, and signing the physical token with a public key which matches a private key stored in a TPM of the IHS. Thereby, the security attribute(s), and correlated limitations for the security attribute(s), may be included alongside the physical token, such as on a DOK. In such implementations, the security attribute(s) for execution of the unreversible command may be an expiration date of root permission from an issuing date of the physical token, shortened time to live for initial engagement with the IHS and/or a list of allowed commands.

Further, in such implementations, execution of the unreversible command on the IHS may be prevented unless the physical token is interfaced (connected) with the IHS, if any of the security attribute(s) on the physical token are not met, or if the public key on the physical token does not match the private key stored in the TPM of the IHS. However, in such implementations, execution of the unreversible command on the IHS may be allowed upon (all of), the physical token being interfaced with the IHS, the security attribute(s) on the physical token being met, and the public key on the physical token matching the private key stored in the TPM of the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an "Information Handling System" (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components. A more detailed example of an IHS is described with respect to FIG. 1.

Figure 1:
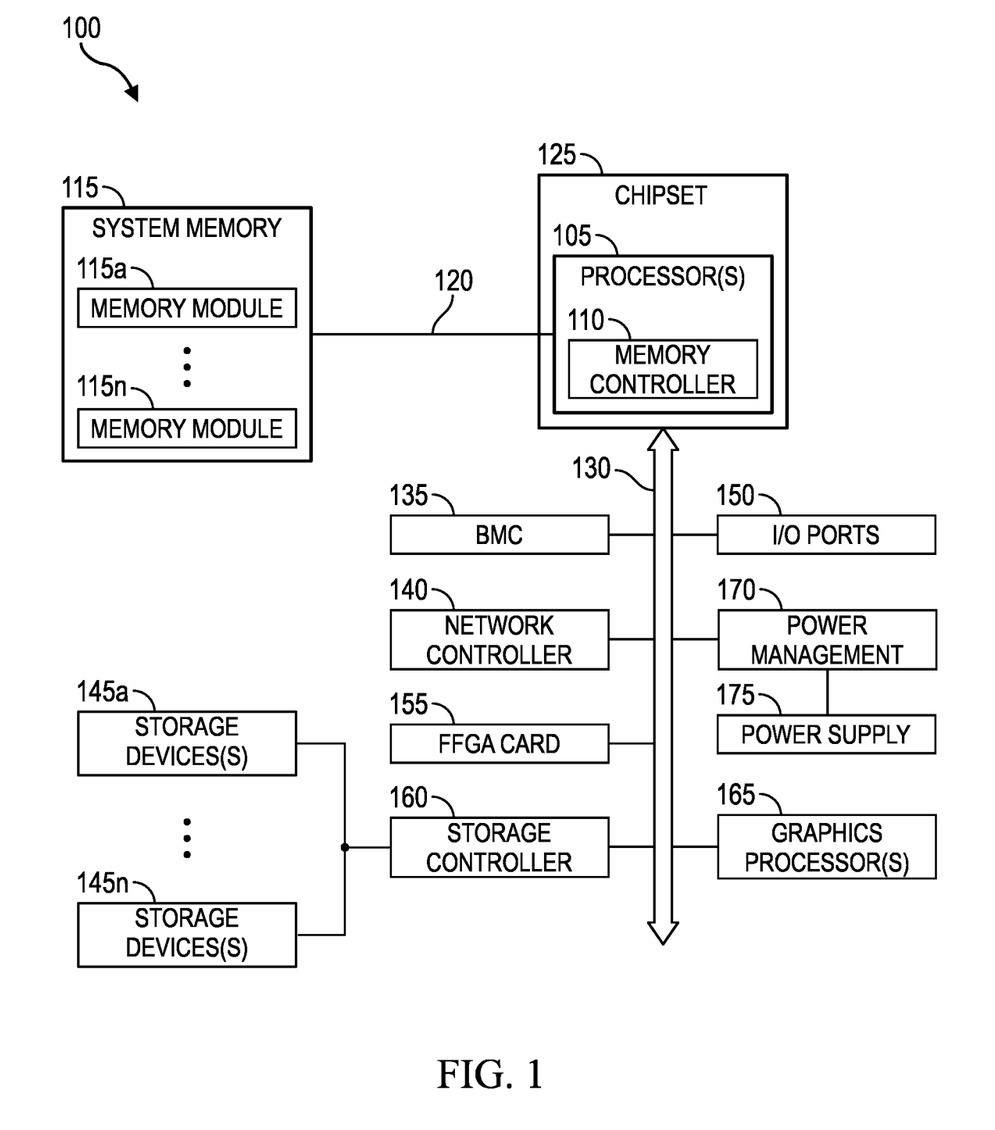
FIG. 1 is a block diagram illustrating components of an example of an Information Handling System (IHS), according to some embodiments.

FIG. 1 is a block diagram illustrating components of example IHS 100, according to some embodiments. IHS 100 may utilize one or more processors 105. In some embodiments, processors 105 may include a main processor and a co-processor, each of which may include a plurality of processing cores that, in certain scenarios, may each be used to run an instance of a server process. In certain embodiments, one or all of processor(s) 105 may be graphics processing units (GPUs) in scenarios where IHS 100 has been configured to support functions such as multimedia services and graphics applications.

As illustrated, processor(s) 105 includes an integrated memory controller 110 that may be implemented directly within the circuitry of the processor 105, or the memory controller 110 may be a separate integrated circuit that is located on the same die as the processor 105. The memory controller 110 may be configured to manage the transfer of data to and from the system memory 115 of the IHS 105 via a high-speed memory interface 120. The system memory 115 is coupled to processor(s) 105 via a memory bus 120 that provides the processor(s) 105 with high-speed memory used in the execution of computer program instructions by the processor(s) 105. Accordingly, system memory 115 may include memory components, such as static RAM (SRAM), dynamic RAM (DRAM), NAND Flash memory, suitable for supporting high-speed memory operations by the processor(s) 105. In certain embodiments, system memory 115 may combine both persistent, non-volatile memory and volatile memory.

In certain embodiments, the system memory 115 may be comprised of multiple removable memory modules. The system memory 115 of the illustrated embodiment includes removable memory modules 115a-n. Each of the removable memory modules 115a-n may correspond to a printed circuit board memory socket that receives a removable memory module 115a-n, such as a DIMM (Dual In-line Memory Module), that can be coupled to the socket and then decoupled from the socket as needed, such as to upgrade memory capabilities or to replace faulty memory modules. Other embodiments of IHS memory 115 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 100 may utilize chipset 125 that may be implemented by integrated circuits that are coupled to processor(s) 105. In this embodiment, processor(s) 105 is depicted as a component of chipset 125. In other embodiments, all of chipset 125, or portions of chipset 125 may be implemented directly within the integrated circuitry of processor(s) 105. The chipset may provide the processor(s) 105 with access to a variety of resources accessible via one or more buses 130. Various embodiments may utilize any number of buses to provide the illustrated pathways served by bus 130. In certain embodiments, bus 130 may include a PCIe switch fabric that is accessed via a PCIe root complex.

As illustrated, IHS 100 includes Baseboard Management Controller (BMC) 135 to provide capabilities for remote monitoring and management of various aspects of IHS 100. In support of these operations, BMC 135 may utilize both in-band, sideband and/or out of band communications with certain managed components of IHS 100, such as, for example, processor(s) 105, system memory 115, chipset 125, network controller 140, storage device(s) 145, etc. BMC 135 may be installed on the motherboard of IHS 100 or may be coupled to IHS 100 via an expansion slot provided by the motherboard. As a non-limiting example of a BMC, the integrated Dell Remote Access Controller (iDRAC) from Dell® is embedded within Dell PowerEdge™ servers and provides functionality that helps information technology (IT) administrators deploy, update, monitor, and maintain servers remotely. BMC 135 may include non-volatile memory having program instructions stored thereon that are usable by CPU(s) 105 to enable remote management of IHS 100. For example, BMC 135 may enable a user to discover, configure, and manage BMC 135, setup configuration options, resolve and administer hardware or software problems, etc. Additionally, or alternatively, BMC 135 may include one or more firmware volumes, each volume having one or more firmware files used by the BIOS' firmware interface to initialize and test components of IHS 100.

IHS 100 may also include the one or more I/O ports 150, such as USB ports, PCIe ports, TPM (Trusted Platform Module) connection ports, HDMI ports, audio ports, docking ports, network ports, Fibre Channel ports and other storage device ports. Such I/O ports 150 may be externally accessible or may be internal ports that are accessed by opening the enclosure of IHS 100. Through couplings made to these I/O ports 150, users may couple IHS 100 directly to other IHSs, storage resources, external networks and a vast variety of peripheral components.

As illustrated, IHS 100 may include one or more FPGA (Field-Programmable Gate Array) cards 155. Each of the FPGA card 155 supported by IHS 100 may include various processing and memory resources, in addition to an FPGA logic unit that may include circuits that can be reconfigured after deployment of IHS 100 through programming functions supported by the FPGA card 155. Through such reprogramming of such logic units, each individual FGPA card 155 may be optimized to perform specific processing tasks, such as specific signal processing, security, data mining, and artificial intelligence functions, and/or to support specific hardware coupled to IHS 100. In some embodiments, a single FPGA card 155 may include multiple FPGA logic units, each of which may be separately programmed to implement different computing operations, such as in computing different operations that are being offloaded from processor 105.

IHS 100 may include one or more storage controllers 160 that may be utilized to access storage devices 145*a-n* that are accessible via the chassis in which IHS 100 is installed. Storage controller 160 may provide support for RAID (Redundant Array of Independent Disks) configurations of logical and physical storage devices 145*a-n*. In some embodiments, storage controller 160 may be an HBA (Host Bus Adapter) that provides more limited capabilities in accessing physical storage devices 145*a-n*. In some embodiments, storage devices 145*a-n* may be replaceable, hot-swappable storage devices that are installed within bays provided by the chassis in which IHS 100 is installed. In embodiments where storage devices 145*a-n* are hot-swappable devices that are received by bays of chassis, the storage devices 145*a-n* may be coupled to IHS 100 via couplings between the bays of the chassis and a midplane of IHS 100. In some embodiments, storage devices 145*a-n* may also be accessed by other IHSs that are also installed within the same chassis as IHS 100. Storage devices 145*a-n* may include SAS (Serial Attached SCSI) magnetic disk drives, SATA (Serial Advanced Technology Attachment) magnetic disk drives, solid-state drives (SSDs) and other types of storage devices in various combinations.

Processor(s) 105 may also be coupled to a network controller 140 via bus 130, such as provided by a Network Interface Controller (NIC) that allows the IHS 100 to communicate via an external network, such as the Internet or a LAN. In some embodiments, network controller 140 may be a replaceable expansion card or adapter that is coupled to a motherboard connector of IHS 100. In some embodiments, network controller 140 may be an integrated component of IHS 100.

In certain embodiments, IHS 100 may operate using a BIOS (Basic Input/Output System) that may be stored in a non-volatile memory accessible by the processor(s) 105. The BIOS may provide an abstraction layer by which the operating system of the IHS 100 interfaces with the hardware components of the IHS. Upon powering or restarting IHS 100, processor(s) 105 may utilize BIOS instructions to initialize and test hardware components coupled to the IHS, including both components permanently installed as components of the motherboard of IHS 100, and removable components installed within various expansion slots supported by the IHS 100. The BIOS instructions may also load an operating system for use by the IHS 100. In certain embodiments, IHS 100 may utilize Unified Extensible Firmware Interface (UEFI) in addition to or instead of a BIOS. In certain embodiments, the functions provided by a BIOS may be implemented, in full or in part, by the remote access controller 135. In some embodiments, BIOS may be configured to identify hardware components that are detected as being currently installed in IHS 100. In such instances, the BIOS may support queries that provide the described unique identifiers that have been associated with each of these detected hardware components by their respective manufacturers. In providing an abstraction layer by which hardware of IHS 100 is accessed by an operating system, BIOS may identify the I/O ports 150 that are recognized and available for use.

In some embodiments, IHS 100 may include a TPM (Trusted Platform Module) that may include various registers, such as platform configuration registers, and a secure storage, such as an NVRAM (Non-Volatile Random-Access Memory). The TPM, which may be (a part of) a TPM controller chip, or the like, which may, in turn be a part of the BIOS and/or chipset 125, may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 100. These calculated hash values may then be compared against reference hash values that were previously stored in a secure non-volatile memory of the IHS, such as during factory provisioning of IHS 100. In this manner, a TPM may establish a root-of-trust that includes core components of IHS 100 that are validated as operating using instructions that originate from a trusted source. A TPM may contain sensitive information such as storage keys, Storage-Root-Keys (SRKs), Platform-Configuration-Registers (PCR), Endorsement-Key (EK), Attestation Identity Keys (AIKs), etc. Typical TPM reset functionality is limited to clearing owner authorization values and keys stored in the TPM. However, some keys, such as an AIK, are not affected by a TPM reset. Embodiments of the present systems and methods may leverage such aspects of the TPM in various aspects of the present systems and methods for verification and/or validation of unreversible IHS commands, as discussed below.

A variety of additional components may be coupled to processor(s) 105 via bus 130. In certain embodiments, a graphics processor 165 may be comprised within one or more video or graphics cards, or an embedded controller, installed as components of the IHS 100. Processor(s) 105 may also be coupled, such as via bus 130 and chipset 125, to power management unit 170 that may interface with power supply 175 of IHS 100.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 105 as a systems-on-a-chip (SoC).

A person of ordinary skill in the art will appreciate that IHS 100 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

A person of ordinary skill will recognize that IHS 100 of FIG. 1 is only one example of a system in which the certain embodiments may be utilized. Indeed, the embodiments described herein may be used in various electronic devices, such as network router devices, televisions, custom telecommunications equipment for special purpose use, etc. That is, certain techniques described herein are in no way limited to use with the IHS of FIG. 1.

Since, as described above, various unreversible commands (i.e., commands that cannot be undone, or otherwise reversed) such as a storage and/or boot device format or erase command, an IHS digital retirement command, or the like, which if mistakenly, or maliciously executed in the IHS will cause permanent damage, embodiments of the present systems and methods provide verification and/or validation of unreversible IHS commands.

For example, some embodiments of the present systems and methods to provide verification and/or validation of unreversible IHS commands may make use of simultaneous authentication via a disk-on-key (DOK) pair. In accordance with such embodiments, execution of such an unreversible command may call for IT personnel verification and validation of the command, pre-execution, alongside adding another physical protection layer for authentication purposes using a pair of disk-on-keys, simultaneously. Thus, a final approval step, for executing the unreversible command may be added, where the unreversible command is acknowledged by IT personnel, or the like, but is also authenticated with a set of physical components and its authentication methodology with the IHS, simultaneously. Thus, in order to eliminate a "human-factor" margin mistake or a malicious action, such embodiments of the present systems and methods place an in-depth integrity (Confidently, Integrity and Availability (CIA) triad model) verification step to the retirement functionality, which is a very sensitive operation. These embodiments, thereby, employ a Multi-Factor Authentication (MFA) methodology where the external devices are authenticated via physical interaction with the IHS and its TPM for a final approval step to execute unreversible commands. This enables simultaneous authentication via a DOK pair procedure, as the final step to initiate digital retirement of the IHS—so that unreversible commands will not be executed, mistakenly or in purpose by malicious actor, alongside with the above-mentioned unique MFA methodology.

In another example, some embodiments of the present systems and methods for providing verification and/or validation of unreversible IHS commands may alternatively, or additionally, make use of a pre-defined root-of-trust with security attributes for unreversible IHS commands. In these embodiments, execution of unreversible commands may be dependent on IT personnel for verification and validation of the command, pre-execution, alongside having security attributes limitation set in place. Such security attributes for the unreversible command may include, by way of example an expiration date of root permission from an issuing date, shorten time to live for initial engagement with the IHS, a list of commands allowed on the IHS, etc. Such embodiments may further employ a physical token, such as may be presented via DOK, which may be produced when a pre-approval for execution of the unreversible command on the IHS is granted. This DOK may include the token alongside the security attributes and their correlated limitation. The token may be signed with a public key, or the like, which matches the targeted IHS. A matching private key for the IHS may, in accordance therewith be stored in the IHS's TPM. Such embodiments limit root-of-trust access to the IHS and narrow potential threats.

Figure 2:
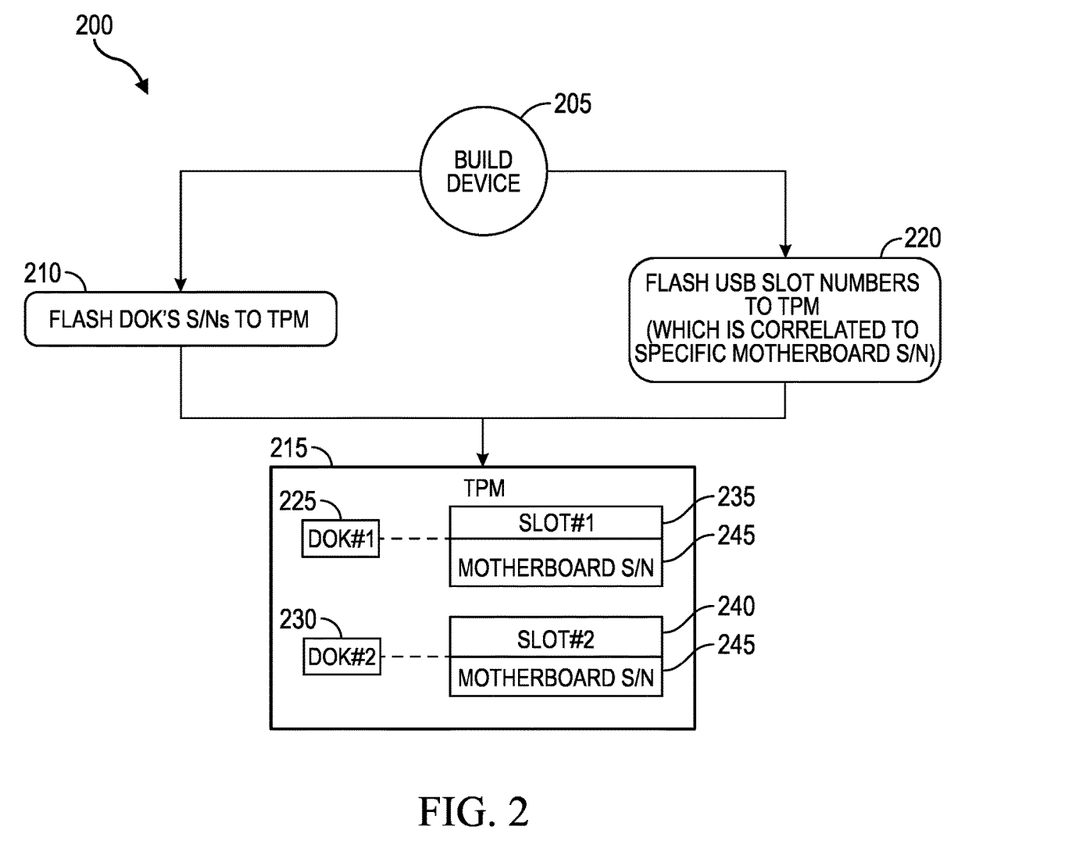
FIG. 2 is a diagrammatic illustration of an example initial phase for implementation of simultaneous authentication via Disk-On-Key (DOK) pair for execution of unreversible commands, according to some embodiments.

FIG. 2 is a diagrammatic illustration of an example initial phase 200 for implementation of simultaneous authentication via a DOK pair for (eventual) execution of unreversible commands, according to some embodiments. For deployment, at the time of manufacture (build) of a subject device (e.g., an IHS) (205), the serial numbers of each of a pair of DOKs are, at 210, flashed to, or otherwise recorded in, IHS (device) TPM 215. At 220, the slot numbers of two USB slots to be used in accordance with embodiments of the present systems and methods are flashed to, or otherwise recorded in, TPM 215. These slot numbers are correlated to a specific motherboard serial number, or the like. For example, USB slot 1 of a particular motherboard serial number, and USB slot 2 of a that particular motherboard serial number, are flashed to TPM 215. Within TPM 215, each of the DOKs (e.g., the serial number of each DOK) 225 and 230 flashed to TPM 215 at 210 are correlated to a respective slot number of the two USB slots 235 and 240 to be used in accordance with embodiments of the present systems and methods flashed to TPM 215 at 220. For example, in the illustrated example of FIG. 2, USB slot 1 (235) of the particular motherboard serial number (245) is correlated in TPM 215 to the serial number of DOK number 1 (225), and USB slot 2 (240) of the particular motherboard serial number (245) is correlated in TPM 215 to the serial number of DOK number 2 (230).

Figure 3:
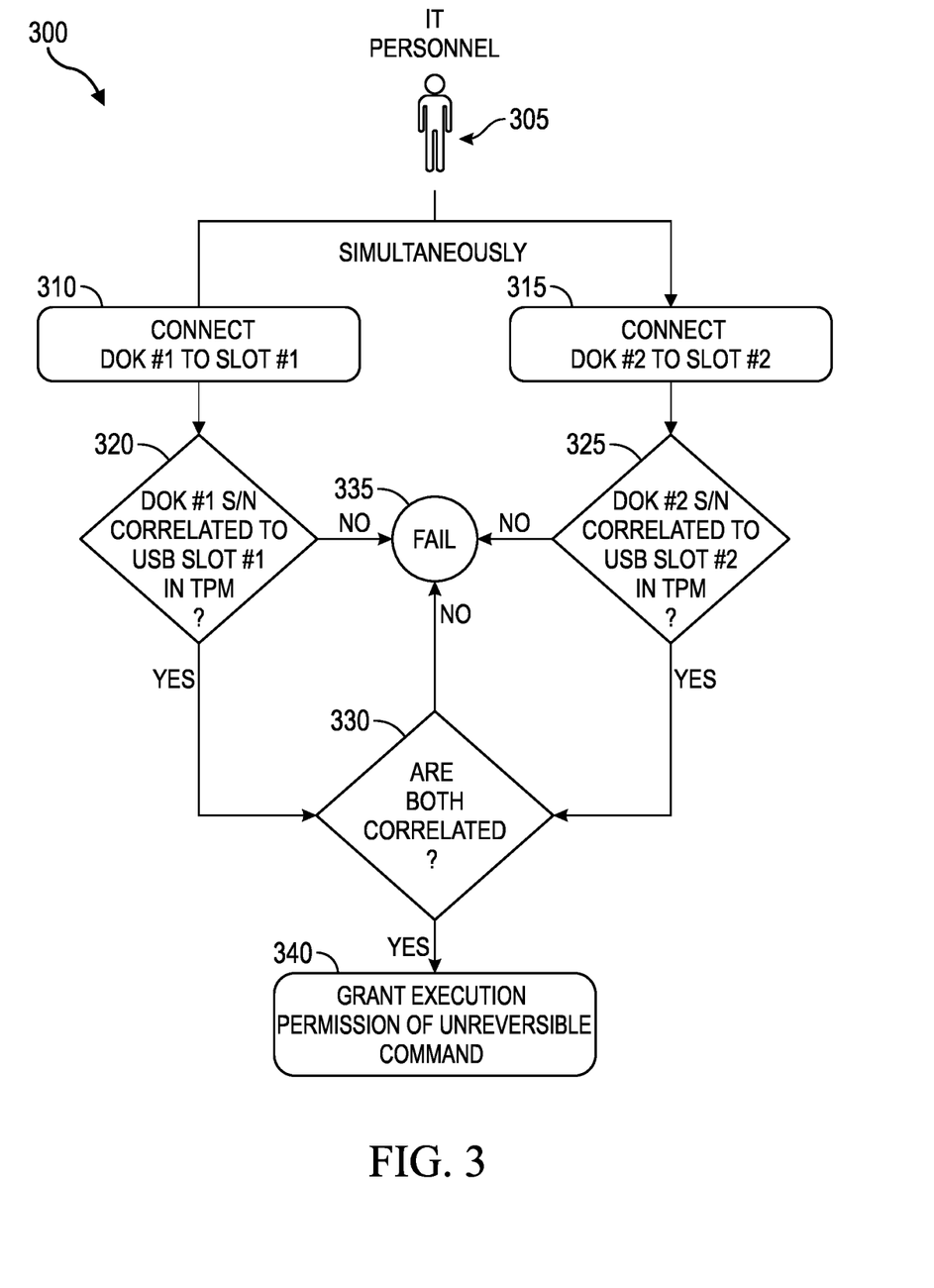
FIG. 3 is a diagrammatic illustration of an example pre-approval phase for implementation of simultaneous authentication, via a DOK pair, for execution of an unreversible command, according to some embodiments.

Once initialized, the DOKs can be used with the IHS having the particular motherboard in a unreversible command pre-approval phase, for execution of the unreversible command. FIG. 3 is a diagrammatic illustration of example pre-approval phase 300 for implementation of simultaneous authentication, via s DOK pair (e.g., 225 and 230), for execution of an unreversible command, according to some embodiments. Phase 300 is carried out on-site, on the IHS to run the unreversible command, and may be carried out by one, or two IT personnel 305 possessing the DOK pair, who connect(s) the two DOKs, simultaneously (i.e., generally at the same time, e.g., within one or two seconds of each other), to the pre-registered slots to the IHS at 310 and 315. For example, in the illustrated example(s), the IT personnel inserts DOK 1 (225) into USB slot 1 (235) of the IHS having the motherboard with the particular serial number (245), and the IT personnel inserts DOK 2 (230) into USB slot 2 (240) of the IHS having the motherboard with the particular serial number (245).

The IHS performs a verification where the DOKs' serials numbers and the specific slots are examined and validated via the TPM (215), where it is determined, at 320 and 325, whether the respective DOK serial numbers and slot numbers (and the motherboard serial number) are correlated in the TPM. For example, in the illustrated example(s), the IHS (TPM 215) determines at 320 whether DOK 1 (225) is correlated in the TPM (215) with USB slot 1 (235) of the IHS having the motherboard with the particular serial number (245), and determines (separately) at 325 whether DOK 2 (230) is correlated in the TPM (215) with USB slot 2 (235) of the IHS having the motherboard with the particular serial number (245). Then it is determined at 330 whether both DOK serial numbers and both slot numbers (and the motherboard serial number) are correlated in the TPM. For example, in the illustrated example(s), the IHS (TPM 215) determines at 330 whether both DOK 1 (225) is correlated in the TPM (215) with USB slot 1 (235) of the IHS having the motherboard with the particular serial number (245), and whether DOK 2 (230) is correlated in the TPM (215) with USB slot 2 (235) of the IHS having the motherboard with the particular serial number (245).

If it is determined at 320, 325 and 330 that either, or both, of the DOK(s) (225 and/or 230) serial number(s) are (is) not correlated with the respective slot number(s) (235 and 240) (and the motherboard serial number (245)) pre-approval phase 300 fails, and ends, at 335, and does not allow the (any) unreversible command to be executed on the IHS. However, if it is determined at 320 and 325 each, and at 330 that both, of the DOK (225 and 230) serial number are correlated with the respective slot numbers (235 and 240) (and the motherboard serial number (245)), the IHS (TPM 215) grants execution permission for the unreversible command at 340. Thusly verified and validated, the unreversible command may be executed Thereby, in accordance with such embodiments, physical presence of IT personnel with a MFA methodology, alongside a sensitive functionality integrity validation process, may eliminate mistaken, or malicious, insider threat, preventing permanent damage to the IHS, while allowing execution of unreversible commands in a secured fashion in an IHS.

In another example, some embodiments of the present systems and methods for providing verification and/or validation of unreversible IHS commands may alternatively, or additionally, make use of a pre-defined root-of-trust with security attributes for unreversible IHS commands. In these embodiments, execution of unreversible commands may be dependent on IT personnel for verification and validation of the command, pre-execution, alongside having security attributes limitation set in place.

Figure 4:
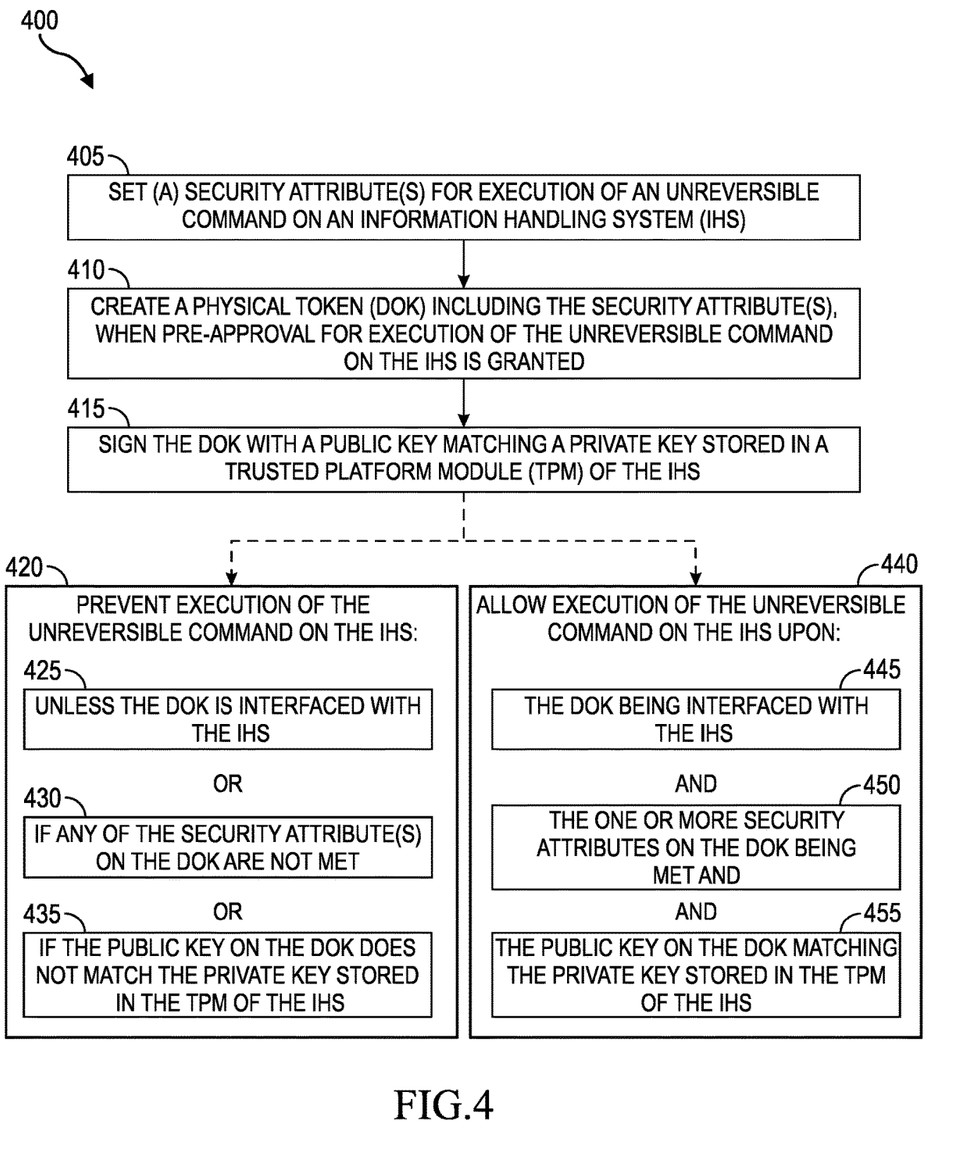
FIG. 4 is a flowchart of an example process for a pre-defined root-of-trust with security attributes for IHS unreversible commands, according to some embodiments.

FIG. 4 is a flowchart of example process 400 for providing a pre-defined root-of-trust with security attributes for IHS unreversible commands, according to some embodiments. Therein, one or more security attributes for execution of a (particular) unreversible command on a (particular) IHS are set at 405. Such security attribute(s) for execution of the unreversible command on the IHS may include an expiration date of root permission from an issuing date of the physical token, shortened time to live for initial engagement with the IHS, a list of allowed commands for execution on the IHS, and/or the like.

Such embodiments may further employ a physical token, such as may be presented via DOK. At 410, a physical token (e.g., a DOK) is created, produced when a pre-approval for execution of the unreversible command on the IHS is granted. This physical token includes the security attribute (s). For example, the physical token may be included alongside the security attribute(s), and correlated limitations for the security attribute(s), on a DOK. Also, such a physical token (DOK) may be one or more of DOKs 230 and 235, above.

The token may be signed with a public key, or the like, which matches the targeted IHS. Therefore, the matching private key for the IHS may, in accordance therewith be stored in the IHS's TPM. So, at 415, the physical token is signed with a public key that matches the private key stored in the TPM of the IHS.

Such embodiments limit root-of-trust access to the IHS and narrow potential threats. For example, execution of the unreversible command on the IHS is prevented, at 420, unless the physical token (DOK) is interfaced with (connected to (a slot of)) the IHS (425), if any of the security attribute(s) on the physical token are not met (430), or if the public key on the physical token does not match the private key stored in the TPM of the IHS (435).

However, execution of the unreversible command on the IHS is allowed (440) upon the physical token (DOK) being interfaced with (connected to (a slot of)) the IHS (445), the security attribute(s) on the physical token being met (450), and the public key on the physical token matching the private key stored in the TPM of the IHS (455).

Figure 5:
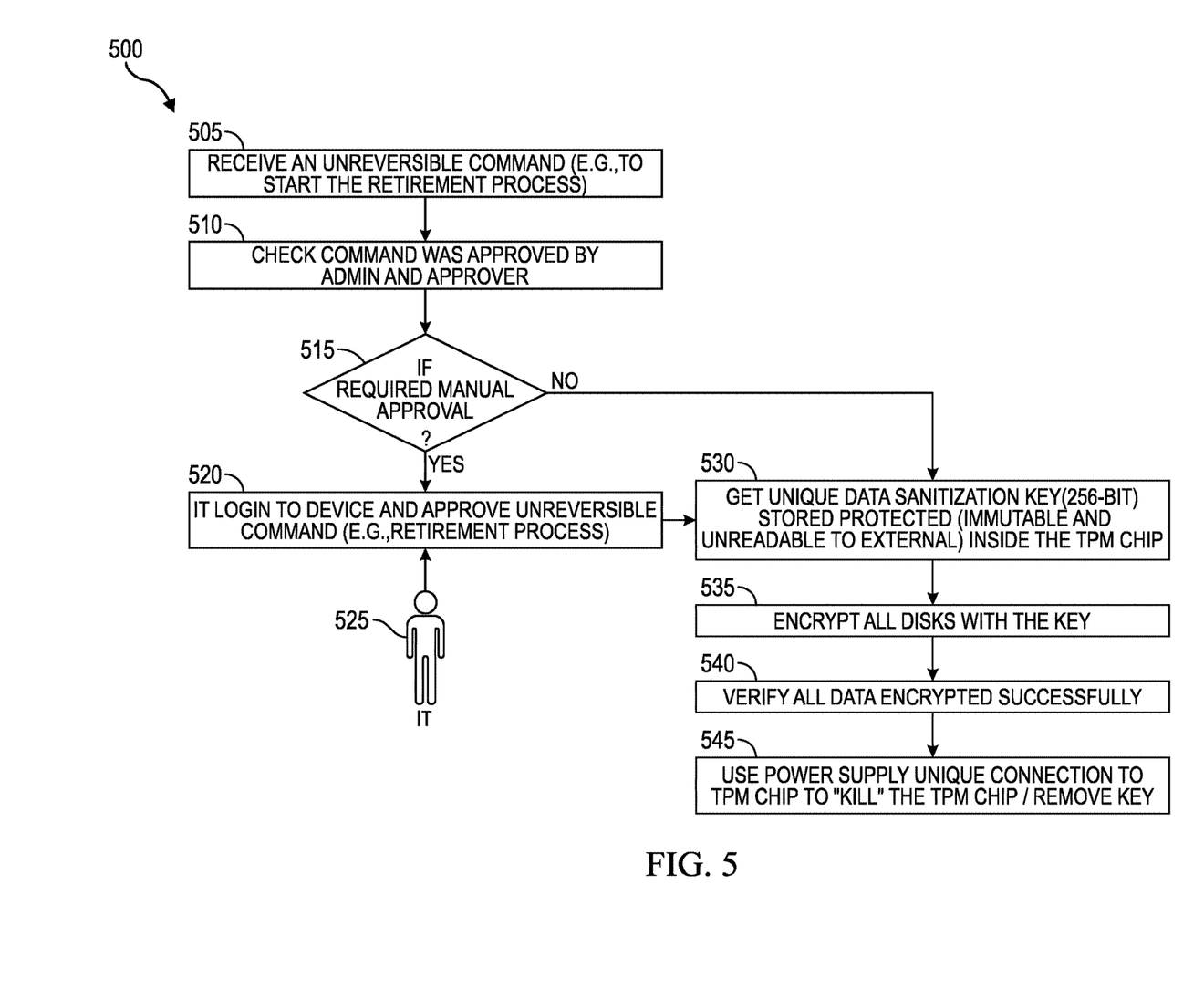
FIG. 5 is a diagrammatic flowchart of an example, IHS-executed, process for digital retirement of the IHS, wherein example embodiments of the present verification and/or validation of an unreversible IHS digital retirement command may be employed, according to some embodiments.

FIG. 5 is a diagrammatic flowchart of example, IHS-executed, process 500 for execution of an unreversible command, according to some embodiments, such as a digital retirement command for an IHS. Therein, an IHS (100) selected for retirement receives, or otherwise retrieves, an unreversible command, a digital IHS retirement command at 505. At 510, the IHS confirms that the selection of the IHS for digital retirement was approved by a(n) (admin) first user and a second (approver) user. Embodiments of the present systems and methods provide options for an additional physical-approval security layer for remote unreversible commands, such as the digital IHS retirement command. As noted, such unreversible commands which are executed in IHSs may cause permanent damage to the IHS. Therefore, in accordance with some embodiments these commands may require to have IT personnel provide verification and validation of the command, pre-execution. Various embodiments of the present systems and methods may (optionally) add an additional command pre-execution security layer via a physical presence of an IT personnel for validation purposes. This may facilitate standing in regulatory compliance, such as by providing rigid constraint requirements, such as physical approval. To such ends, embodiments of the present systems and methods may add a physical approval step for validation purposes of unreversible commands. This will allow for a physical verification and validation procedure, so that unreversible commands will not be executed, mistakenly, alongside standing with regulatory compliance standards. To such ends, embodiments of the present systems and methods, may include the steps described below for on premise login to the IHS and on premise, secondary approval of the unreversible command execution. This physical presence of IT personnel for validation of pre-execution step of unreversible commands for an IHS, may thusly, prevent permanent, unintended, damage to the IHS. By using such a physical pre-execution validation step business continuity and growth to other sectors via standing with regulatory compliance requirements for physical-control approval may be enabled.

At 515 a determination is made, by the IHS as to whether manual approval of the retirement process is required (such as manually, at the IHS, itself) for digital retirement of the IHS to proceed. If it is determined at 515 that such manual approval of the retirement process is required (at the IHS) for digital retirement of the IHS to proceed, then at 520, (IT) user 525 is authorized and/or authenticated, such as by the IHS, such as through MFA, for approval, or other validation or authentication, of the unreversible (digital retirement) command.

Since digital retirement of the IHS is an unreversible command, which if mistakenly executed in the IHS will cause permanent damage, some embodiments may make use of embodiments of the present systems and methods, wherein simultaneous authentication, via a disk-on-key (DOK) pair at 520, in accordance with embodiments of the present systems and methods, provides authorization and/or authenticated of (IT) user 525, for execution of the unreversible digital retirement command. In accordance with such embodiments, execution of such an unreversible command may call for IT personnel verification and validation of the command, pre-execution, alongside adding another physical protection layer for authentication purposes using a pair of disk-on-keys, simultaneously. Thus, at 520 a final approval step, for executing the unreversible (retirement) command may be added, where the unreversible (retirement) command is acknowledged by IT personnel 525, but is also authenticated with a set of physical components and its authentication methodology with the IHS, simultaneously. Thus, in order to eliminate a "human-factor" margin mistake or a malicious actor, such embodiments of the present systems and methods place an in-depth integrity (Confidently, Integrity and Availability (CIA) triad model) verification step to the retirement functionality, which is a very sensitive operation, alongside the above-described digital retirement initiation process(s). These embodiments employ, as discussed above, an MFA methodology where the external devices are authenticated via physical interaction with the IHS and its TPM for final approval step to execute unreversible commands, such as the digital retirement command. This enables simultaneous authentication via a disk-on-key pair procedure, as the final step to initiate digital retirement of the IHS so that unreversible commands will not be executed, mistakenly or on purpose by a malicious actor, alongside the above-mentioned unique MFA methodology.

As discussed above, with respect to FIGS. 2 and 3, for deployment, at the time of manufacture of the IHS, the serial numbers of a pair of DOKs are flashed to the IHS's TPM (at 210), which is correlated to specific IHS USB slot numbers to be assigned in accordance herewith are also flashed to the TPM at (220). The approval phase of these embodiments, such as at 520 above, is carried out, on-site, on the IHS. Whereby, an IT personnel (525) connects the two DOKs, simultaneously, to the pre-registered slots to the IHS (such as, at 310 and 315, above). The IHS performs a verification procedure where the DOKs' serials numbers and the specific slots are examined and validated via the TPM (such as, at 320 325 and 330, above). If the serial numbers and slot numbers are thusly verified and validated, the unreversible command is executed (per 340, above), for example, per below, with respect to a digital retirement command, starting at 530. Thereby, in accordance with such embodiments, physical presence of IT personnel with a MFA methodology, alongside a sensitive functionality integrity validation process, may eliminate mistaken, or malicious, insider threat, preventing permanent damage to the IHS, while allowing execution of unreversible commands in a secured fashion in an IHS.

Alternatively, or additionally, some embodiments may make use of a pre-defined root-of-trust with security attributes for unreversible IHS commands, such as process 400 described above, with respect to FIG. 4. In these embodiments, execution of unreversible commands may be dependent on IT personnel for verification and validation of the command, pre-execution, alongside having security attributes limitation set in place (such as, at 405, above). As noted, such security attributes for the unreversible command may include, by way of example an expiration date of root permission from an issuing date, shortened time to live for initial engagement with the IHS, list of commands allowed on the IHS, or the like. Such embodiments may further employ a physical token, such as may be presented via DOK, which may be produced (such as, at 410, above) when a pre-approval for execution of the unreversible command on the IHS is granted. This DOK may include the token alongside the security attributes and their correlated limitation. The token may be signed (such as, at 415, above) with a public key, or the like, which matches the targeted IHS. A matching private key for the IHS may, in accordance therewith be stored in the IHS's TPM. Such embodiments limit root-of-trust access to the IHS and narrow potential threats (such as, at 420, above).

In response to receipt, by the IHS, of the manual approval of retirement of the IHS for retirement from the (IT)] user (at the IHS), from 520 or if it is determined at 515 that such manual approval of the digital retirement process is not required, digital retirement of the IHS proceeds (such as, in accordance with 340 or 440, above), starting at 530.

At 530, the (256-bit) (unique) data sanitization key is retrieved, such as from the TPM (controller (chip)), and at 535, all data stored, or otherwise present in the IHS is encrypted using the data sanitization key. Then at 540, the IHS verifies that all data on the IHS has been successfully encrypted. In response to verification, at 540, that all data on the IHS has been encrypted successfully, the TPM (controller (chip)) is incapacitated at 545, such as by spiking, killing, destroying, or otherwise incapacitating the TPM (controller (chip)), thereby, destroying the associated root-of-trust of the IHS and the data sanitization key itself. Such incapacitation (destruction) of the TPM (controller (chip)) and thereby the associated root-of-trust of the IHS and the data sanitization key itself may be carried out at 545 by the IHS, TPM, by way of example, instructing the power supply (175, such as via power management unit 170) to overvolt, or otherwise burnout, the IHS TPM (controller (chip)).

In accordance with the foregoing, embodiments of the present systems and methods for verification and/or validation of unreversible information handling system commands may employ simultaneous authentication, via DOK pair, for execution of unreversible commands. Wherein, physical presence of IT personnel, or the like, is coupled with a unique MFA methodology, alongside a sensitive functionality integrity validation process, for eliminating mistakenly and/or malicious insider threats. Hence, executing unreversible commands in a secured fashion in IHSs. Thus, preventing permanent damage to the IHS. Also, using a unique MFA methodology alongside a sensitive functionality integrity validation process, enables business continuity, and the like.

Further in accordance with the foregoing, embodiments of the present systems and methods for verification and/or validation of unreversible information handling system commands may employ pre-defined roots-of-trust, with security attributes, for unreversible IHS commands. Wherein, use of a physical token, such as a DOK, combined with usage limitation(s) alongside storing the key in the TPM, act to limit root-of-trust access in an IHS and narrows potential threats.

Consentient with the foregoing, embodiments of the present systems and methods, may thereby, provide General Data Protection Regulation (GDPR) compliance (GDPR is a regulation in EU law on data protection and privacy in the European Union and the European Economic Area). U.S. National Institute of Standards and Technology Cybersecurity Framework (NIST CSF) compliance, Center for Internet Security (CIS) compliance, etc.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Reference is made herein to "configuring" a device ora device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

What is claimed is:

1. A method for verification and/or validation of unreversible information handling system commands, the method comprising:
  verifying an unreversible command in an information handling system;
  validating the unreversible command in the information handling system, wherein the verifying and validating take place pre-execution;
  authenticating execution of the unreversible command in the information handling system with one or more physical components wherein the one or more physical components comprise two pre-registered disks-on-keys;

receiving connection of the two pre-registered disks-on-keys, generally simultaneously, to pre-registered slots of the information handling system;

determining whether a serial number of each respective pre-registered disk-on-key is correlated with a different respective pre-registered slot number in a trusted platform module of the information handling system;

preventing the execution of the unreversible command on the information handling system, in response to the serial number of each respective pre-registered disk-on-key not being correlated with a different respective pre-registered slot number in the trusted platform module of the information handling system; and allowing the execution of the unreversible command on the information handling system, in response to the serial number of each respective pre-registered disk-on-key being correlated with the different respective pre-registered slot number in the trusted platform module of the information handling system.

2. The method of claim 1, further comprising, before the receiving connection of the two pre-registered disks-on-keys to the pre-registered slots of the information handling system:

flashing the serial numbers of each of the disks-on-keys, to the trusted platform module of the information handling system to pre-register the disks-on-keys;

flashing slot numbers of the pre-registered slots to the trusted platform module of the information handling system to the pre-registered slots; and correlating, in the trusted platform module of the information handling system, the serial number of one of disks-on-keys with one of the slot numbers and the serial number of the other of the disks-on-keys with the other of the slot numbers.

3. The method of claim 2, wherein flashing the serial numbers of each of the disks-on-keys, to the trusted platform module of the information handling system, flashing the slot numbers of the two slots to the trusted platform module of the information handling system, and correlating the serial number of one of disks-on-keys with one of the slot numbers and the serial number of the other of the disks-on-keys with the other of the slot numbers, is carried out at a time of manufacture of the information handling system.

4. The method of claim 1, wherein, the one or more physical components comprises a physical token produced when a pre-approval for the execution of the unreversible command on the information handling system is granted, and the verifying the unreversible command, the validating the unreversible command and the authenticating execution of the unreversible command further comprise:

setting one or more security attributes for the execution of the unreversible command on the information handling system;

including the one or more security attributes in the physical token when the physical token is produced;

signing the physical token with a public key which matches a private key stored in a trusted platform module of the information handling system;

preventing the execution of the unreversible command on the information handling system:

if the public key on the physical token does not match the private key stored in the trusted platform module of the information handling system;

unless the physical token is interfaced with the information handling system; and allowing the execution of the unreversible command on the information handling system upon:

the physical token being interfaced with the information handling system; and the public key on the physical token matching the private key stored in the trusted platform module of the information handling system.

5. The method of claim 4, wherein the one or more security attributes for execution of the unreversible command comprises one or more of an expiration date of root permission from an issuing date of the physical token, shortened time to live for initial engagement with the information handling system, and a list of allowed commands.

6. The method of claim 4, further comprising presenting the physical token via a disk-on-key.

7. The method of claim 6, further comprising including the physical token alongside the one or more security attributes and correlated limitations for the one or more security attributes on the disk-on-key.

8. A method for verification and/or validation of unreversible information handling system commands, the method comprising:

receiving connection of two pre-registered disks-on-keys, generally simultaneously, to pre-registered slots of an information handling system;

determining whether a serial number of each respective pre-registered disk-on-key is correlated with a different respective pre-registered slot number in a trusted platform module of the information handling system;

preventing execution of the unreversible command on the information handling system, in response to the serial number of each respective pre-registered disk-on-key not being correlated with a different respective pre-registered slot number in the trusted platform module of the information handling system; and allowing the execution of the unreversible command on the information handling system, in response to the serial number of each respective pre-registered disk-on-key being correlated with the different respective pre-registered slot number in the trusted platform module of the information handling system.

9. The method of claim 8, wherein determining whether the serial number of each respective pre-registered disk-on-key is correlated with a different respective pre-registered slot number in the trusted platform module of the information handling system, further comprises determining whether the serial number of each respective pre-registered disk-on-key is correlated with a different respective pre-registered slot number and a serial number of the information handling system's motherboard, in the trusted platform module of the information handling system.

10. The method of claim 8, wherein determining whether the serial numbers of each respective disk-on-key is correlated with the respective slot numbers in the trusted platform module of the information handling system further comprises determining both of:

whether the serial number of a first disk-on-key is correlated with the slot number of the slot receiving the first disk-on-key, in the trusted platform module of the information handling system; and whether the serial number of a second disk-on-key is correlated with the slot number of the slot receiving the second disk-on-key, in the trusted platform module of the information handling system.

11. The method of claim 10, wherein determining whether the serial number of the first disk-on-key is correlated with the slot number of the slot receiving the first disk-on-key and whether the serial number of the second disk-on-key is correlated with the slot number of the slot receiving the second disk-on-key, in the trusted platform module of the information handling system, further comprises determining whether the first and second disks-on-keys are correlated with a serial number of the information handling system's motherboard, in the trusted platform module of the information handling system.

12. The method of claim 8, further comprising, before the receiving connection of the two pre-registered disks-on-keys, generally simultaneously to the pre-registered slots of the information handling system:
    flashing the serial numbers of each of the disks-on-keys, to the trusted platform module of the information handling system to pre-register the disks-on-keys;
    flashing the slot numbers of the two slots to the trusted platform module of the information handling system to the pre-registered slots; and
    correlating, in the trusted platform module of the information handling system, the serial number of one of disks-on-keys with one of the slot numbers and the serial number of the other of the disks-on-keys with the other of the slot numbers.

13. The method of claim 12, wherein correlating the serial number of one of disks-on-keys with one of the slot numbers and the serial number of the other of the disks-on-keys with the other of the slot numbers, further comprises correlating, in the trusted platform module of the information handling system, the serial numbers of each of disks-on-keys with a serial number of the information handling system's motherboard.

14. The method of claim 13, wherein flashing the serial numbers of each of the disks-on-keys, to the trusted platform module of the information handling system, flashing the slot numbers of the two slots to the trusted platform module of the information handling system, and
    correlating the serial number of one of disks-on-keys with one of the slot numbers and the serial number of the other of the disks-on-keys with the other of the slot numbers, is carried out at a time of manufacture of the information handling system.

15. A method for verification and/or validation of unreversible information handling system commands, the method comprising:
    setting one or more security attributes for execution of a unreversible command on an information handling system;
    creating a physical token produced when a pre-approval for execution of the unreversible command on the information handling system is granted, the physical token including the one or more security attributes;
    signing the physical token with a public key which matches a private key stored in a trusted platform module of the information handling system;
    preventing the execution of the unreversible command on the information handling system:
        if the public key on the physical token does not match the private key stored in the trusted platform module of the information handling system;
        unless the physical token is interfaced with the information handling system; and
    allowing execution of the unreversible command on the information handling system upon:
        the physical token being interfaced with the information handling system; and
        the public key on the physical token matching the private key stored in the trusted platform module of the information handling system.

16. The method of claim 15, further comprising presenting the physical token via a disk-on-key.

17. The method of claim 16 further comprising including the physical token alongside the one or more security attributes and correlated limitations for the one or more security attributes on the disk-on-key.

18. The method of claim 15, wherein the one or more security attributes for execution of the unreversible command comprises one or more of an expiration date of root permission from an issuing date of the physical token, shortened time to live for initial engagement with the information handling system, and a list of allowed commands.

19. The method of claim 15, wherein the unreversible command is a particular unreversible command and/or the information handling system is a particular information handling system.

* * * * *